United States Patent [19]

Whitby

[11] 4,274,109
[45] Jun. 16, 1981

[54] SCANNED BEAM COLOR VIDEO GENERATOR

[75] Inventor: Clyde M. Whitby, Duncanville, Tex.

[73] Assignee: The Singer Company, Binghamton, N.Y.

[21] Appl. No.: 102,051

[22] Filed: Dec. 10, 1979

[51] Int. Cl.³ .............................................. H04N 9/10
[52] U.S. Cl. ......................................... 358/53; 358/75
[58] Field of Search ........................ 358/41, 53, 75, 63

[56] References Cited

U.S. PATENT DOCUMENTS

| | | | |
|---|---|---|---|
| 3,075,432 | 1/1963 | Myers | 358/66 X |
| 3,495,029 | 2/1970 | Underhill | 358/62 |
| 4,021,845 | 5/1977 | Wang | 358/75 |

Primary Examiner—Robert L. Richardson
Attorney, Agent, or Firm—J. Dennis Moore; Jeff Rothenberg

[57] ABSTRACT

Technique for generating scanned video signals for a viewed scene by scanning a beam of white light across the scene to be viewed and detecting the amounts of light reflected from the scene in each three spectral regions corresponding to the primary colors. The beam of white light comprises four monochrome components. Three components comprise beams of monochrome light corresponding to the three primary colors, while the fourth component is a monochrome beam of light having a color intermediate two of the primary colors, and intermediate adjacent color distinguishable pigment reflectance fall-off regions.

9 Claims, 4 Drawing Figures

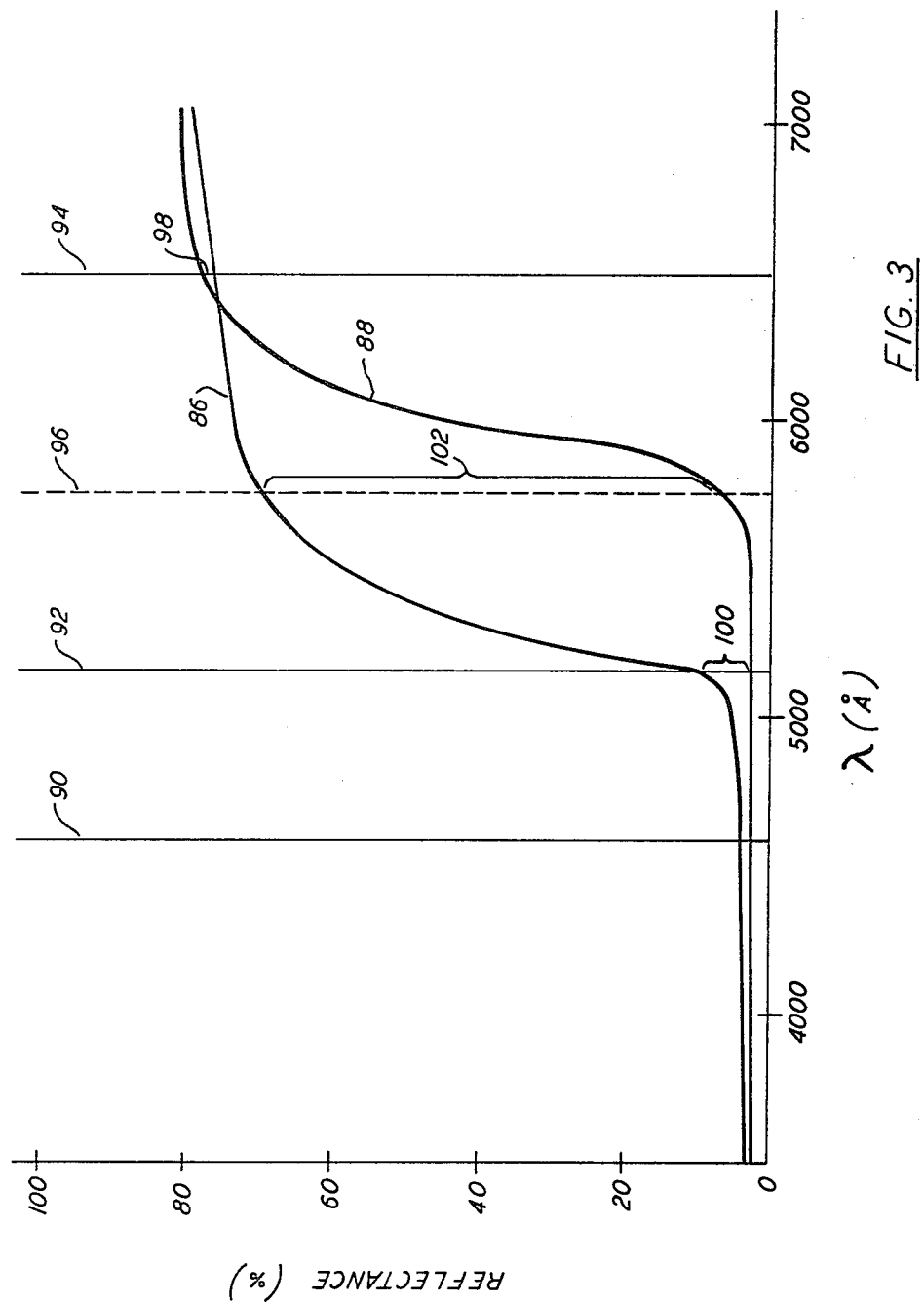

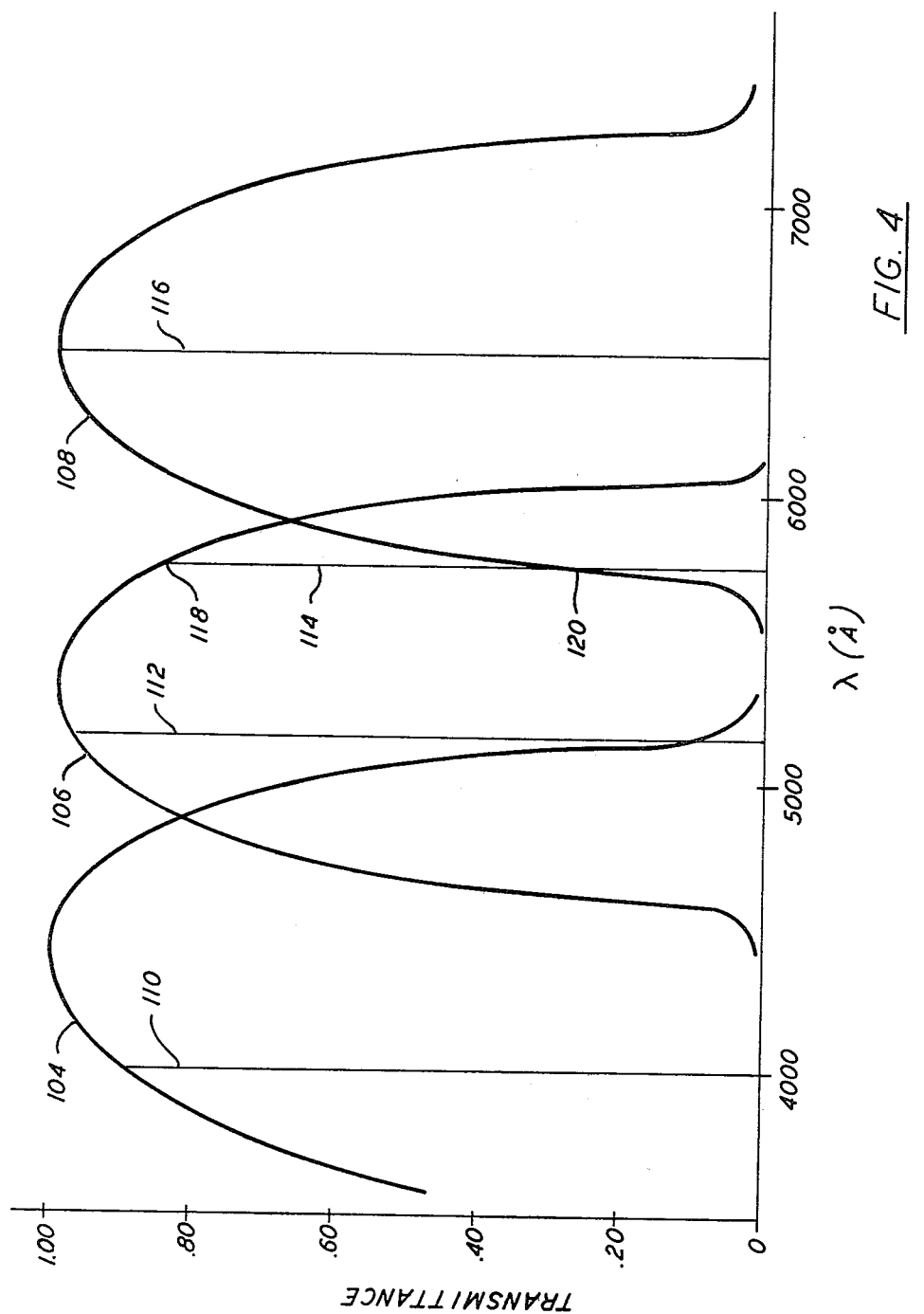

SCANNED BEAM COLOR VIDEO GENERATOR

FIELD OF THE INVENTION

The present invention relates to scanned image generation systems, and more particularly relates to such systems in which the image is generated by scanning a beam of white light across the scene to be viewed and detecting amounts of reflected beam which lie in three primary color spectral regions.

BRIEF DESCRIPTION OF THE PRIOR ART

The advent of the continuous wave ("CW") laser brought numerous advances in the area of scanned image display devices. Inventors soon recognized that by generating separate monochrome CW laser beams, corresponding to each of the three primary colors, separately amplitude modulating each of those beams according to video information, combining those beams into a single beam of light and scanning that beam across the display surface, a television image could thus be projected onto that surface. Not only does such a technique permit video projection, but it also allows the display of a very wide angle image. Examples of such systems can be found in U.S. Pat. Nos. 3,510,571 and 3,549,800.

Another laser area being explored presently is that of scanned image color signal generation using a beam of light which is scanned across a scene to be viewed. According to this technique, CW lasers producing laser radiation of three primary spectral colors are generated and combined to form a single beam of white laser light. This beam is scanned across the scene to be viewed by way of mirrors, or other scanning devices, in the pattern of a scanned raster. Three photoelectric cells in the vicinity of the scanned scene detect the light which is reflected off of the scene. Each photocell has a filter associated with it which admits light in the region of only one of three primary colors. Thus, one photocell detects only red light, another green, and the third blue. The signal outputs from the three photocells thus provide color video information about the scene which is scanned. These signals can, for example, be used to drive a conventional television set to generate a display of the scanned scene.

A major area of application for such technique is simulation. Flight simulators, for example, must display to a pilot visual information corresponding to what the pilot would see were he flying an actual aircraft. This information is typically displayed on a television CRT positioned in front of the simulator cockpit.

One way in which video information for the CRT is generated is by way of a modelboard image generation system. Such a system employs a large, accurately detailed scale model of an extensive geographical area. This modelboard is illuminated, and a television camera is made to move about it. The television camera is typically mounted on a servosystem which "slaves" to a computer. The computer continually calculates the position and attitude of the simulated aircraft being "flown", and commands the camera to move accordingly. Thus, a very accurate and realistic video image is generated for the simulator pilot.

The scanned laser image generation technique is particularly suited for the modelboard image generation system. Instead of a camera, a scanning mechanism may be employed which moves about the modelboard much the same as a television camera. Instead of receiving light to form an image, as does the television camera, the scanner projects a beam of white light and scans it across the scene to be viewed. Signal generation occurs in a bank of filter/photocell combinations mounted above the board.

However, it is noted that when a three component white laser beam, such as described above, is used in such an image generation system, color fidelity is poor in certain color regions. Objects which appear chromatically distinct under continuous spectrum light, for example, may be the same color or nearly so when viewed on the final display device. Further, it is found that changing the wavelength of the primary color components does not improve color fidelity. In fact, changing primary color wavelengths from their optimal primary color spectral values simply causes color fidelity degradation over larger color areas.

Yet, light beam scanning for image generation is possible only because of the high resolution and light intensity which lasers are capable of providing by virtue of their low beam dispersion. Continuous spectrum light sources are simply not considered practical for this application.

It is therefore an object of this invention to provide a scanned light beam image generator which utilizes laser light to form the light beam.

It is a further object to improve the chromatic differentiability of scanned laser beam image generators over existing systems.

It is a still further object of the present invention to provide such an improvement without adding substantially to the complexity or cost of such systems.

SUMMARY OF THE INVENTION

The present invention is a scanned laser image generation system which scans a beam of white laser light across a pigmented scene to be viewed and detects the light reflected therefrom in three distinct spectral regions corresponding to the three primary colors. Four monochrome light components are generated: three primary color components, and a fourth component having a color intermediate two of the three primary colors and also intermediate adjacent color distinguishable pigment reflectance fall-off regions.

BRIEF DESCRIPTION OF THE DRAWINGS

These and other features of the present invention will be more clearly understood from a consideration of the following description taken in conjunction with the accompanying drawings in which

FIG. 2 is a standard CIE diagram showing the location of the four laser components employed in the preferred embodiment of the present invention; while FIG. 3 is a graph showing the reflectance curves for two pigments; and FIG. 4 is a graph showing the transmittance curves of three filters useable in connection with the present invention.

DETAILED DESCRIPTION OF THE PREFERRED EMBODIMENT

Figure 1:
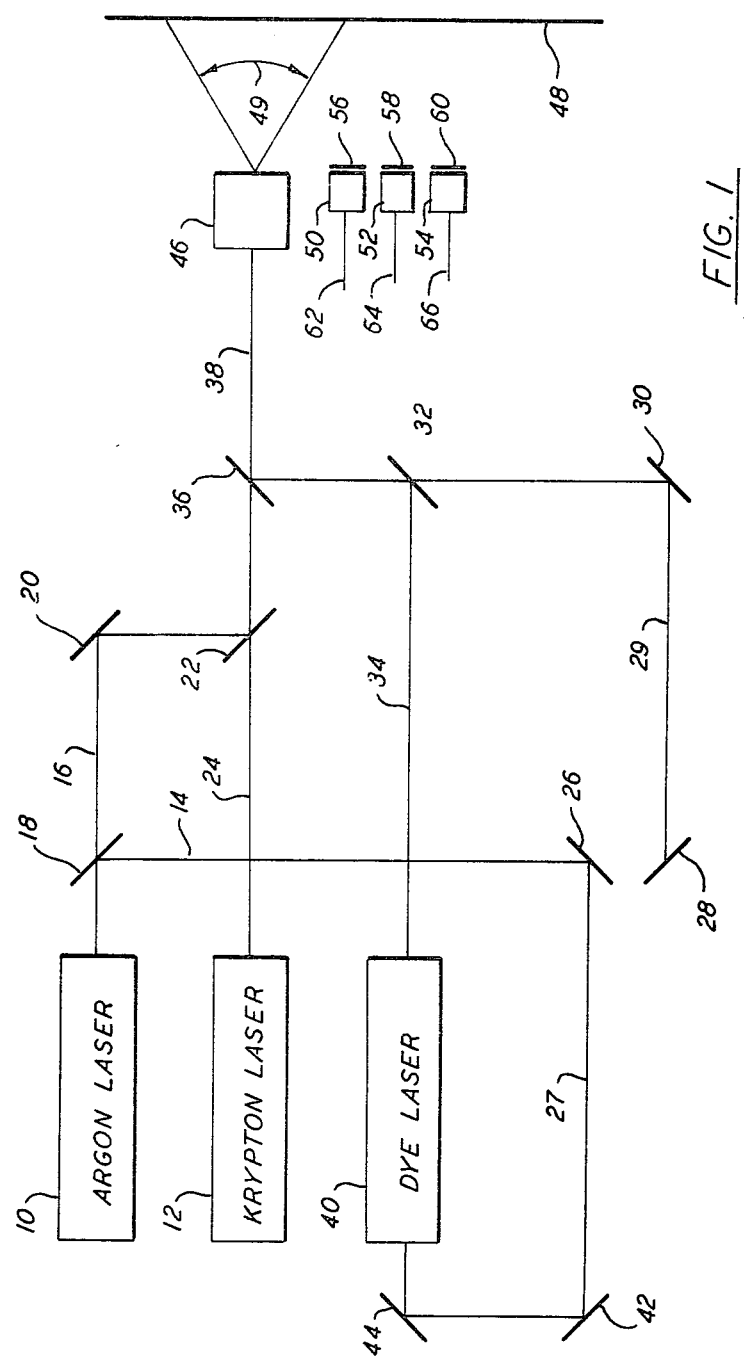
FIG. 1 is a schematic diagram of a scanned laser image generation system constructed according to the present invention.

FIG. 1 shows the schematic diagram of a scanned laser image generation system employing the preferred embodiment of the present invention. Three lasers are used. An argon laser 10 is used to generate both green and blue light radiation. The argon laser 10 produces a strong green light component having a wavelength of 5154 angstroms (Å) and at least two strong blue components having wavelengths of 4579 Å and 4880 Å, respectively. The 4880 Å component may be filtered out or used to supplement the 4579 Å component, if so desired. A krypton laser 12 is used to produce red light. The krypton laser generates a strong red component having a wavelength of 6471 Å.

The green light 14 of the argon laser output is split off from the blue light 16 by way of a first dichroic mirror 18. Dichroic mirrors are well known in the art and pass certain selected bands of light while reflecting others. This mirror 18 is oriented at a 45° angle to the path of the argon beam, as shown, and allows the blue 4579 Å light 16 to pass through it while reflecting the blue 4880 Å and green light 18 at a right angle. The blue 4579 Å component 16 is reflected by a first mirror 20 to a second dichroic mirror 22. The blue 4579 Å light 16 and the red light 24 of the krypton laser 12 are joined at the second dichroic mirror 22, which allows the red light 24 to pass through it while reflecting the blue 4579 Å light 16 as shown.

The blue 4880 Å and green light 14 reflected from the first dichroic mirror 18 passes through a beamsplitter 26 where a first portion 27 of the light is diverted for a purpose which will be explained below. Beamsplitters are also well known in the art and, with respect to a predetermined wavelength of spectrum of light, pass a portion of that light while reflecting most of the rest. The remaining portion 29 of the blue 4880 Å and green light 14 continues through the beamsplitter 26 to a third dichroic mirror 28 where the green light is reflected to a fourth dichroic mirror 30 while most of the blue 4880 Å light passes through third dichroic mirror 28. The fourth dichroic mirror 30 behaves like third dichroic mirror 28 and reflects the green light of the second portion 29 to a fifth dichroic mirror 32 which allows the green portion 29 to pass through while reflecting a fourth yellow light beam 34, which will be described below. The yellow light 34 and the green light 14 are combined with the red light 24 and the blue light 16 at a sixth dichroic mirror 36 to form a composite white laser light beam 38.

The first portion 27 of the blue 4880 Å and green light which was split off at the beamsplitter 26 is routed to a dye laser 40 by way of second and third mirrors 42 and 44. This portion 27 of the blue 4880 Å and green light beam "pumps" the dye laser according to principles well known in the art. The dye laser produces a continuous laser beam having a different wavelength from those which pump it. The preferred embodiment of the present invention contemplates a rhodamine 6G dye laser, which produces an output light beam having maximum laser radiation at approximately 6,000 Å. The dye laser 40 cavity is fine tuned, however, so that the laser produces an output light beam having a wavelength of 5750 Å. This yellow light 34 is directed to the fifth dichroic mirror 32 to be reflected to the sixth dichroic mirror 36 where it joins the other three laser light beams, as described above. The power outputs of all the lasers are adjusted to produce an optimal white beam as evidenced by maximum color fidelity on the display device.

The composite white laser beam 38 is directed to a scanner 46 where it is scanned across a scene, such as a modelboard 48, as shown by arrow 49. Three photocells 50, 52, and 54 are positioned in the vicinity of the surface of the modelboard 48 where the scanned beam strikes it. Each photocell is covered by a filter characterized by maximum transmittance in a spectral region encompassing one of three primary colors. For example, the first filter 56 associated with the first photocell 50 might be a red filter, while the second filter 58 might be a green filter, in which case the third filter 60 would be a blue filter. Red, green and blue filters suitable for this purpose are Kodak's Wratten 25, Wratten 58 and Wratten 47, respectively.

The output of each photocell, therefore, corresponds to the light content in one of each primary color spectral region, and may therefore be used as a color video channel. The photocell outputs 62, 64, 66 together provide complete video information about the scanned scene.

Figure 2:
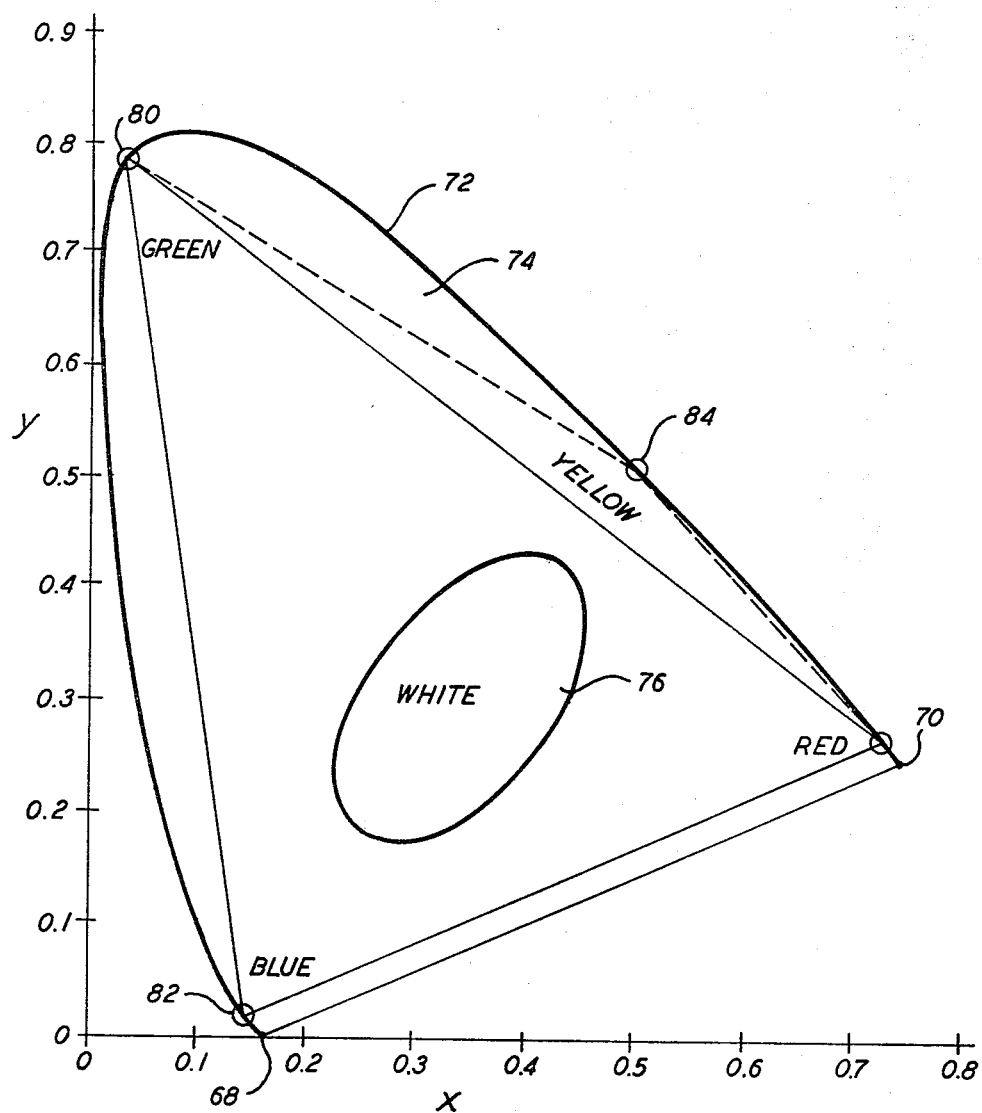

FIG. 2 shows a standard C.I.E. chromaticity chart. This diagram, as is well known in the art, is a tool which permits one to predict the color of a combination of one or more monochrome light components. Every point on the curved portion of the periphery from point 68 to point 70 corresponds to a single wavelength of light. Point 68 corresponds to 4,000 Å and point 70 corresponds to 7,000 Å, while the curved portion 72 represents the continuum of wavelengths in between. The straight line portion between point 68 and point 70 merely completes the enclosure of the region 74 within the curved portion 72.

Each point within the region 74 corresponds to a particular color having a particular saturation level, with the most peripheral points corresponding to the most saturated colors, and the innermost points, within the subregion 76, corresponding to white. This region may be mapped, or divided, into areas corresponding to identifiably distinct color regions which actually blend one into the other. The areas of red, yellow, green, blue and white are indicated in the drawing. Any saturation color represented by a point within the region 74 can be reproduced by one or more monochrome components, as is known in the art. Also, given any three or more distinct monochrome light components, any saturation color represented by a point within the bounds of the polygon formed by connecting the points corresponding thereto, can be produced by the appropriate mixture of those components.

The locations of the four laser components of the preferred embodiment, described above, are shown on the arc of FIG. 2 as circles: red 78, green 80, blue 82 and the fourth, yellow 84. The primary color circles 78, 80 and 82 have been joined by solid lines to form a triangle, as shown. Dashed lines connect the yellow light circle 84 to the red 78 and green 80 circles.

It can be seen that the three primary color points provide an excellent range of possible color rendition. Using these three light components most of the color region between blue and red can be reproduced with close to full saturation, while some saturation is lost in color regions between blue and green and between green and red. It would appear from an inspection of this diagram that the addition of the yellow component at 74 would at most allow for the reproduction of more saturated color in the yellow region. But it would also appear that ample color differentiation in this region should be obtainable by means of the combination of green and red light alone, according to the above-described principles of color illumination using the CRT chart. In other words, any color found in triangle 68, 70, 72 should be reproducible by the appropriate combination of the three components represented by those points.

However, it is found that in such scanned laser image generation systems as described above, chromatic differentiation is very poor in certain spectral regions, most notably in the tan-orange region between red and yellow. Chromatic distinctions between, for example, tan sand, red clay and orange leaves or paint are nearly nonexistent, all of the above appearing to be somewhat uniform red.

However, it is found that adding a yellow component such as the yellow spectral component 84 in FIG. 2, selected according to the principles of the present invention, dramatically increases color differentiation, particularly in red-orange-yellow region.

To understand why this is so, and also to understand the principles by which the selection of the fourth, supplemental light source is made, reference should be made to FIG. 3. FIG. 3 shows the reflectance curves of two typical pigments, representing yellow and red, respectively. Curve 86 represents a yellow pigment, while curve 88 represents a red one. Superimposed on this graph are the three selected primary laser color wavelengths, shown in solid lines 90, 92, 94, and the fourth, supplemental laser wavelength shown as a dashed line 96.

Note that the primary difference between the yellow reflectance curve 86 and the red reflectance curve 88 is in the wavelength region where the curves "fall off" from relatively high reflectance to relatively low reflectance. Both curves show distinct and fairly well defined reflectance fall-off regions. As a consequence, under daylight these pigments appear to be of different color. However, when scanned with the three component white laser light beam, the two pigments appear very similar in color, both appearing quite red.

The reason for this can be determined from an inspection of FIG. 3. The similarity in color is caused by the relative similarity in the amount of reflected light of each of the components of light reflected from the two pigments. The difference in the amount of reflected red light is represented by the line segment 98, while the difference in the amount of reflected green light is represented by the line segment designated 100. Both of these differences are quite small compared to the total amount of reflected light off the surfaces of these two pigments, as can be seen.

The appearance of the reflected light from both of these pigments will therefore be quite similar. And, since the photocells 50, 52 and 54, are only provided with the light from the reflected laser components for information as to the color of the spot being illuminated, this defect is present in outputs of the image generation system of FIG. 1 as well.

The addition of the fourth component 96 provides information to the photocells which enables them to differentiate between the red and yellow pigments. FIG. 4 aids in illustration of this point. FIG. 4 is a graph which shows the transmittance curves 104, 106, 108, of three "ideal" filters useable in conjunction with photocells as taught in connection with FIG. 1. "Ideal" filter curves (in that their peak transmittance is 1.0) are used simply to aid in clarity of discussion.

Superimposed on the graph are four lines 110, 112, 114, and 116, corresponding to the four laser wavelengths used in the preferred embodiment of the present invention. The points at which the lines 110, 112, 114, 116 intersect each of the transmittance curves 104, 106, 108, determine the relative amount of light of that wavelength which passes through the filter associated with the respective curve. For example, point 118 shows that the green filter, corresponding to curve 106, has a transmittance of 0.85 for light having a wavelength of 7570 Å. Thus, 85% of the yellow light of the preferred embodiment incident on the green filter passes through it to its associated photocell. Similarly, point 120 shows that the red filter transmits approximately 27% of the yellow light incident upon it. Therefore, the difference in amount of yellow light reflected off the scene due to the different reflectances of the pigments at the wavelength represented by the dashed segment 102 in FIG. 3 shows up in the photocell output as a significant difference in the "green" photocell output 64 (FIG. 1) and a moderate difference in the "red" photocell output 62 (FIG. 1).

Thus the additional information provided by the yellow component is detected in the photocells and, consequently, is present in the final display device as improved color fidelity. FIG. 3 shows that this information, represented by the dashed line segment 102, is considerable.

The "differentiability" of the system can be optimized by selecting for the fourth laser light a wavelength at which the difference in the reflectance of the two pigments affected most is the greatest. This will be approximately between the adjacent reflectance-fall-off regions, as described above, of the two pigments. An important thing to keep in mind in this regard is that any variation of the wavelength of the fourth laser will affect the overall color balance of the system, and power level adjustments will probably have to be made to one or more of the other lasers to cure any consequent color system imbalance caused thereby.

It should be apparent that the particular wavelengths selected for each of the lasers is subject to a certain amount of latitude. It is believed, however, that the laser wavelengths selected herein are optimal for the model board type of generation system wherein the model board is colored by typical commercially available pigments. Nonetheless, any such system employing the principles illustrated herein is intended to fall within the scope of the invention as hereinafter claimed.

What is claimed is:

1. A scanned light beam color video signal generation apparatus for use in conjunction with a scene colored by at least two different pigments, comprising:
   (a) photoelectric means for detecting incident light thereon and providing as an output three signals containing information as to the relative spectral content of the incident light in each of three primary color wavelength regions, respectively, such that said three signals comprise a color video signal;
   (b) light beam generating means for generating a beam of white light comprising four monochromatic spectral components, wherein three of said components comprise primary color components in the red, green and blue spectral regions, respectively, and said fourth component comprises a monochromatic component intermediate in wavelength of two of said primary color components such that said fourth component lies in wavelength approximately between adjacent color distinguishable pigment reflectance fall-off regions; and (c) scanning means for scanning said beam of white light onto said scene, whereby the portion of said beam of white light which is reflected off of said scene is said incident light which said photoelectric means detects.

2. The apparatus of claim 1 wherein said fourth component has a wavelength such that a maximum difference exists in the amount of said fourth component reflected from said two pigments.

3. The apparatus of claim 1 wherein said photoelectric means comprises:
   (a) three photoelectric cells, positioned so as to detect said incident light; and
   (b) three color filters for passing light primarily in the wavelength region of one of each of the three primary colors, respectively, each positioned intermediate one of said three photoelectric cells, respectively.

4. The apparatus of claim 1 wherein said light beam generating means comprises laser beam means for generating said beam of white light such that said components are beams of monochromatic laser light.

5. The apparatus of claim 4 wherein said laser beam means comprises:
   (a) laser means for generating beams of laser light at approximately 4579 Å, 5154 Å, 5750 Å and 6471 Å; and
   (b) means for causing said beams to emerge from said laser means in a single composite beam of white light.

6. The apparatus of claim 5 wherein said laser means comprises:
   (a) an argon laser for producing a beam of said 4579 Å and said 5154 Å laser light;
   (b) a krypton laser for producing a beam of said 6471 Å laser light;
   (c) a dichroic mirror for splitting said beam of 4579 Å and 5154 Å light into a beam of 4579 Å light and a beam of 5154 Å light;
   (d) a beamsplitter for splitting said 5154 Å light beam into two separate beams of 5154 Å light; and
   (e) a dye laser which receives one of said separate 5154 Å beams and produces a beam of 5750 Å laser light in response thereto.

7. The apparatus of claim 6 wherein said dye laser is tuneable as to the wavelength of its output light beam, whereby said fourth component can be optimally tuned in wavelength to maximize said difference in the amount of said fourth component reflected from said two pigments.

8. A method for generating a scanned color image signal for a scene colored by at least two different pigments comprising the steps of:
   (a) generating three beams of substantially monochromatic light, one each of the three primary colors;
   (b) generating a fourth beam of monochromatic light intermediate in wavelength of two of said three primary colors, and, in wavelength, approximately between adjacent color distinguishable pigment reflectance fall-off regions;
   (c) combining said four beams to form a single beam of white light;
   (d) scanning said beam of white light across a desired portion of the scene according to a predetermined pattern; and
   (e) detecting the amounts of light reflected off the scene within three wavelength regions encompassing one each of three primary colors, and generating three signals corresponding to said amounts of light.

9. The method of claim 8 wherein said step of generating a fourth beam is performed by generating said fourth beam at a wavelength such that a maximum difference exists in the amount of said fourth component reflected from said two pigments.

* * * * *